Feb. 23, 1954 W. G. SWAINE 2,669,914
METHOD OF MAKING METAL FOIL PANS
Filed June 12, 1950 2 Sheets-Sheet 1
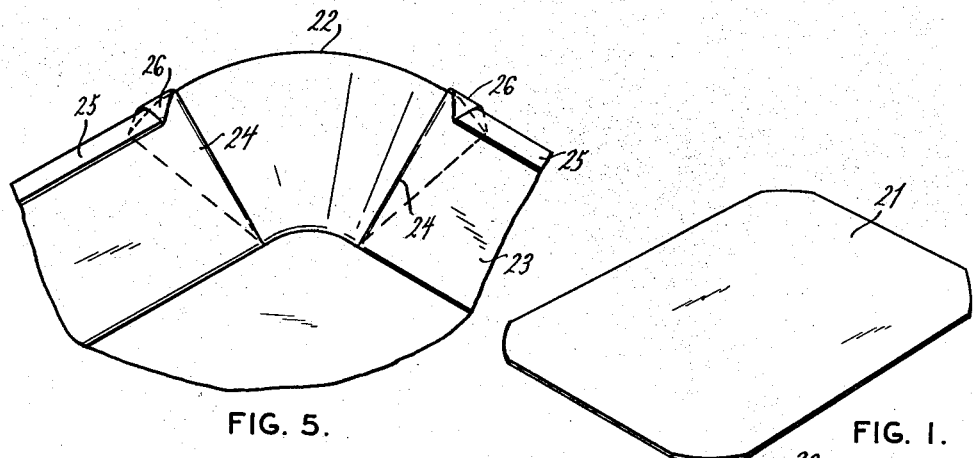
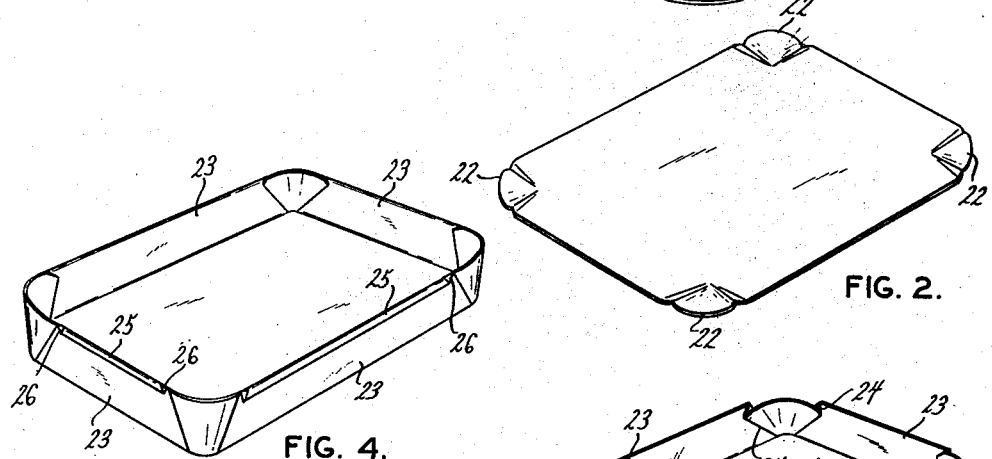
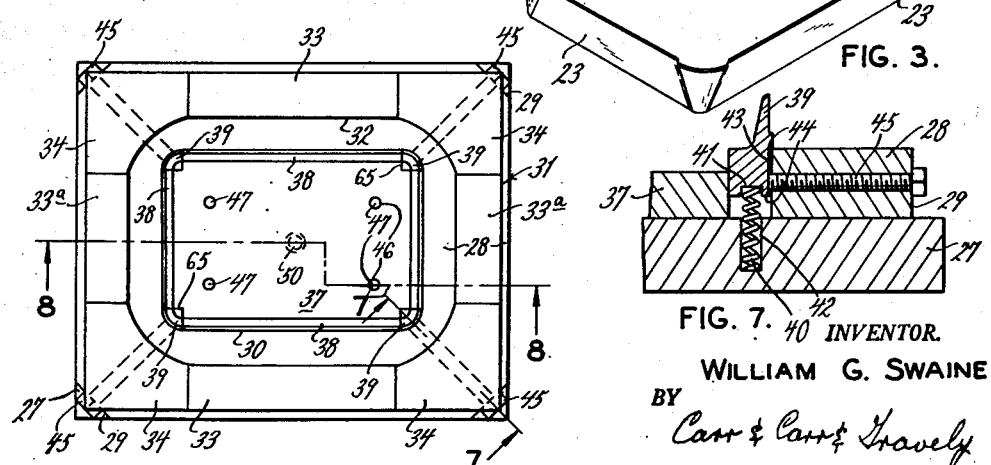
INVENTOR.
WILLIAM G. SWAINE
BY
Carr & Carr & Gravely
ATTORNEYS Feb. 23, 1954  W. G. SWAINE  2,669,914
METHOD OF MAKING METAL FOIL PANS
Filed June 12, 1950  2 Sheets-Sheet 2
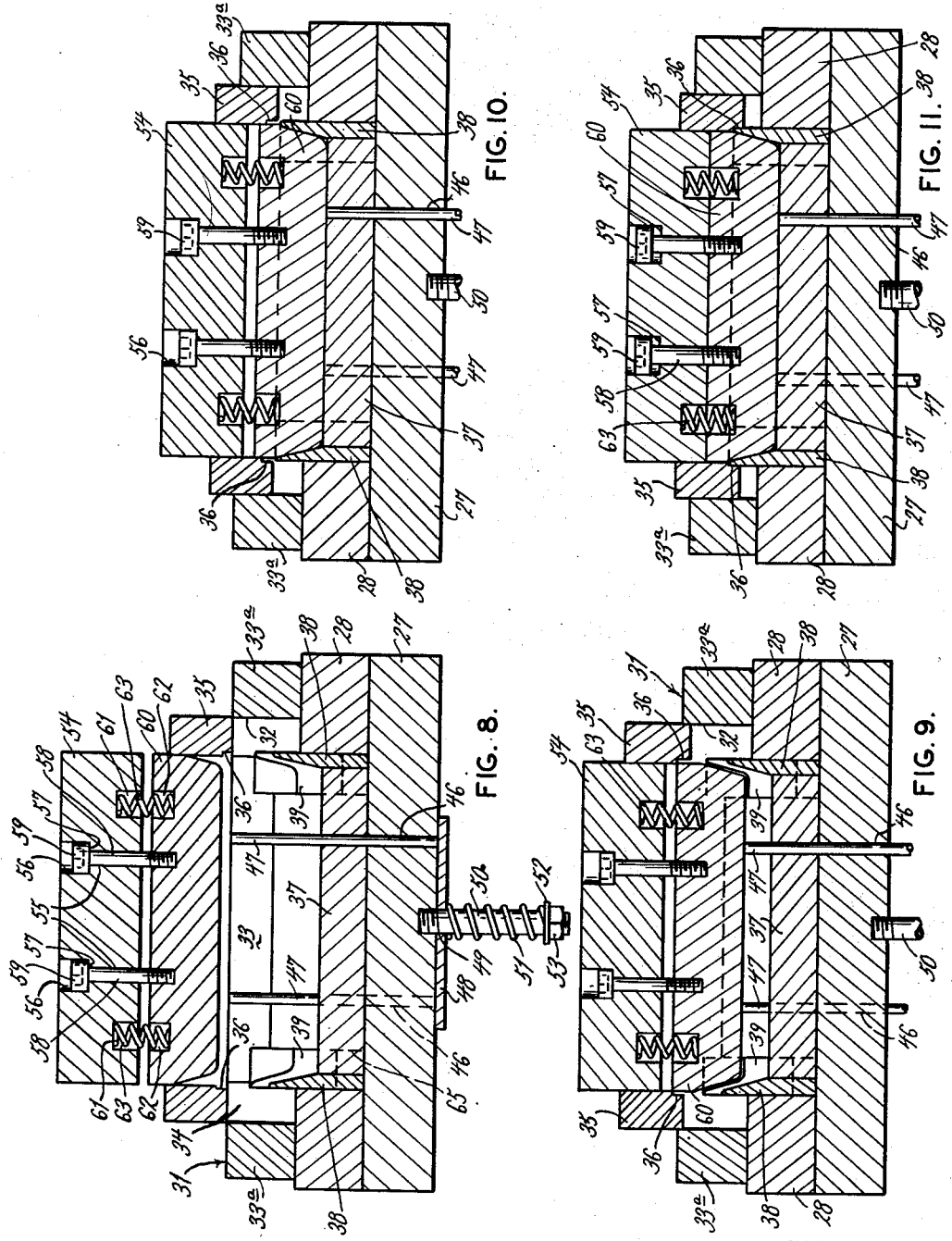
INVENTOR.
WILLIAM G. SWAINE
BY
Carr & Carr & Gravely
ATTORNEYS Patented Feb. 23, 1954

2,669,914

UNITED STATES PATENT OFFICE 2,669,914

METHOD OF MAKING METAL FOIL PANS

William G. Swaine, Brentwood, Mo., assignor to Aluminum Foil Packaging Co., St. Louis, Mo., a corporation of Missouri Application June 12, 1950, Serial No. 167,636

3 Claims. (Cl. 93—51)

This invention relates to the manufacture of baking pans from thin sheet metal, such as aluminum in thicknesses of .008 inch or less, commonly known as "foil"; and, more particularly, relates to single-use pans of such inexpensive construction that commercial bakeries may bake in them and distribute the baked goods without removing them from such pans.

A prime object of my invention is to devise an inexpensive pan, and a method of manufacturing same, wherein bakery goods may be partially baked at a commercial bakery, marketed without removing said pan, and finish-baked and served by the housewife in said pan.

It is another object of the present invention to produce from foil a baking pan having low cost and attractive appearance so as to be suitable as a pan and baking tray for packaging and distributing bakery goods.

A further object is to produce a foil pan possessing sufficient strength and rigidity to withstand handling in commercial bakeries and the forces encountered in packaging, distribution, and selling.

Another object is to produce out of light sheet metal a pan having rounded corners and flanged edges interlocked with said corners.

A further object is to devise a method of manufacturing a baking pan of the type aforementioned in a single operation by a single stroke of a fast-acting machine tool, such as a punch press.

The above and other objects will become more fully apparent from the following specification, which, by way of illustration rather than limitation, sets forth a preferred process and a preferred form of pan constituting embodiments of the present invention, which is further illustrated in the accompanying drawings and, more particularly, pointed out in the claims.

In the accompanying drawings (two sheets):

Figure 1 is a perspective view of a flat foil blank from which the pan is formed;

Figure 2 is a perspective view of such blank at the next stage in the process, with the pan corner tucks initially folded upwardly;

Figure 3 is a perspective view of the next stage of forming of the pan, showing the sides folded upwardly and the corner tucks about closed;

Figure 4 is a perspective view of a completed pan;

Figure 5 is an enlarged fragmentary perspective detail showing a pan corner from outside and below;

Figure 6 is a plan view of a lower or female die which, with a mating die, not shown, is utilized for blanking and forming such pan in a double-acting punch press;

Figure 7 is a sectional view taken along line 7—7 of Figure 6;

Figure 8 is a sectional elevational view of the lower die assembly as seen at line 8—8 in Fig. 6, together with the press operated upper die parts shown in position for blanking, that is, at the stage of operation corresponding with the stage of manufacture shown in Figure 1;

Figure 9 is a similar view to Figure 8 but showing the upper die elements of Figure 8 at the pan forming stage corresponding to Figure 2;

Figure 10 is a similar view to Fig. 8 showing the die elements of Figure 8 at the forming stage corresponding to Figure 3; and Figure 11 is a similar view to Fig. 8 showing the die elements of Figure 8 at the forming stage corresponding to Figure 4.

Referring now in more detail and by reference characters to the drawings, which illustrate a preferred embodiment of the present invention, the initial forming step is to produce a blank 21 of thin sheet metal; for example, aluminum foil .004 inch thick. Said blank 21 is illustrated in Figure 1 in its flat condition, that is, after blanking but before the forming operation described hereinafter.

The next step in forming is to bend up the fan-shaped rounded or arcuately flattened corners 22 of the flat blank 21, as illustrated in Figure 2 and in the die of Fig. 6. Thereafter, successive operations are carried on so that the sides 23 are formed upward and outside of corners 22; and the material between said unfolded sides 23 and the corners 22 is folded upon itself at each side of the corners to form corner tucks 24. The provision of two tucks at each corner reduces the bulk of the tucks and allows the forming of a smooth corner wall right down to the bottom surface of the pan. Further, the tucks are not formed in a haphazard manner but are located in the manner shown by the provision of separate corner die parts which have an initial forming function on the blank. As a final step, the edges of the upfolded sides 23 are bent or rolled outward and slightly downward to comprise side flanges 25. This bending operation also serves to bend outward a portion of the upper edges of tucks 24, forming a plica or "nip" 26. A function of said plica 26 is to bind the material of corner tucks 24 to side flanges 25 and thus prevent the opening of said tucks 24 under hoop-tension loads, such as result when the pans are filled with a fluid or semi-fluid mass. A further function of said plicas 26 is to provide smooth, folded-over end portions for side flanges 25 lessening the possibility of cutting the fingers of persons handling the pans.

The shape of blank 21 is economical in that there is little waste when such blanks are cut from a continuous strip of material. Plica 26, which results from folding and tucking blank 21 in the manner indicated, takes the place of material-wasting tabs, such as are frequently employed to secure other types of sheet-metal pans.

In addition to the pan so described, my invention goes to the method and process of manufacture of such pan. For this purpose, I use a conventional double-acting punch press, not shown. The press is of known type, characterized by a lower bed, an inner ram linked by a connecting rod to the crank-shaft of the press, and an outer ram adapted to reciprocate along the same line of movement as said inner ram. With said type of press, the stroke of the outer ram is caused to vary from coincidence with that of the inner ram by cam means affixed to the crank-shaft of the press. The pressure of said cam means is resisted by restoring springs acting between the said inner and outer rams.

The pan above described is made during a single stroke of such double-acting punch press in the manner hereinafter described and utilizes dies as shown in the drawings and explained hereafter.

Referring to Figures 6 and 8, I provide a rectangular base plate 27 for mounting the lower die assembly to the bed of the punch press, (the press itself is of standard construction and is not here illustrated). On base plate 27 is mounted a filler casting 28 of the same length and width as base plate 27 but having cut-off outer corners 29 and a centrally disposed cut-out 30 of a size corresponding substantially with that of the pan to be formed. Said filler casting 28 serves as a foundation for and has mounted upon it the lower blanking die 31 whose inner edge 32 corresponds in shape to blank 21. For ease of manufacture, said lower blanking die 31 may be made up of separate sections, the drawing here showing two, each of long side sections 33 and short side sections 33a and four corner sections 34. The inner periphery of these, taken together, form a blanking edge. Said lower blanking die 31 mates with and receives the upper blanking punch 35, which is adapted for mounting to and beneath the outer ram of such double-acting press. Along the inner edge of punch 35 is flange-forming chamfer or groove 36.

Referring again to Figures 6 and 8, mounted upon base plate 27 and spaced within the filler casting 28 is bottom die segment 37 whose shape corresponds to the generally rectangular, curved-corner bottom of the pan to be manufactured. Adjacent the straight portions of the sides of bottom die segment 37 and serving to space it within filler casting 28, are upwardly-extending, tapering, round-edged blades 38, which are adapted to form the sides 23 and to mate with chamfer 36 to form the flanges 25 of the pan. Between the adjacent blades 38 are the concavely hollowed outside corner die segments 39. The die segment 37 has been notched a 65 in each corner to form a guideway for said die segments 39. These notches 65 are best seen in Figs. 6 and 7. Each of these die segments 39, as shown in detail in Figure 7, rests on a compression spring 40 inserted in the mating recesses 41, 42, in the corner die segments 39 and base plate 27, respectively. Within the outer surface of each of said corner dies 39 is cut a vertical guide groove or keyway 43, whose upper and lower ends serve as abutments 44. Removable bolts 45 are tapped through filler casting 28 at cut-off corners 29 to engage said guide groove 43. These bolts 45 permit vertical movement of the corner dies 39 within the limits permitted by guide groove abutments 44. From the drawing it is apparent that at the lower limit of their travel, the said outside corner die segments 39 will be retracted to form along with bottom 37 and blades 38 a female die for the pan as a whole. At the upper limit of their travel said outside corner die segments 39 are at such height above the blades 38 (Fig. 8) that they function to form the tucks 24 in the pan corners in advance of the formation of the pan sides by blades 38, as hereinafter described.

Bottom segment 37 and base plate 27 are penetrated by a plurality of bores 46 through which protrude push-out pins 47 mounted on a pin plate 48. Said pin plate has a central bore 49 which adapts it for vertical movement along rod 50. Said rod 50 is affixed below the base plate 27 and supports compression spring 51 which rests on collar 52 and nut 53 mounted on rod 50. The spring 51 yieldably supports plate 48 for the pins 47.

Referring to the upper die elements, affixed beneath the main or inner ram of the double-acting press (not shown) is the upper central mounting casting 54 penetrated by bores 55 having diametrally-enlarged upper portions 56. The junctures of said upper enlarged bore portions 56 with bores 55 constitute shoulder stops 57. Adapted for reciprocal movement within bores 55 are stop bolts 58 whose heads 59 are adapted to engage shoulder stops 57. The lower threaded portions of bolts 58 are fixedly mounted in a floating upper male die 60, so that the die may be suspended by them. It will be seen that the shoulder stops 57 serve to limit the amount by which male die 60 may be separated from the mounting casting 54. In the mated recesses 61, 62, bored in mounting casting 54 and male die 60, respectively, are compression springs 63 which effect such separation until their force is overcome by bottoming male die 60.

The following is a description of the process of pan-folding as it is carried out with the particular dies illustrated. As the double-acting press is engaged, its outer ram lowers in advance of its inner ram causing the blanking punch 35 (Fig. 9) to cut the blank 21 shown in Figure 1. Said blank 21 is thereafter supported by push-out pins 47 and is pressed downward against said pins by male die 60. As said die 60 lowers, the said pins 47 are depressed and pin plate 48 is gradually lowered, compressing the spring 51 against the collar 52. When male die 60 approaches the raised corner die segments 39, as shown in Figure 9, the said corner die segments 39 fold the corners 22 of blank 21 upward about said male die 60, which gradually depresses said corner die segments 39 against their compression springs 40. As said male die 60 continues its descent, blades 38 form the pan sides 23 upward. When said male die 60 bottoms against the bottom die segment 37, as in Figure 10, the corner die segments 39 are flush with said bottom die segment 37, and push-out pins 47 are fully retracted. Compression springs 63, holding male die 60 apart from mounting casting 54, are then still extended. It is at this stage that the pan sides 23 are flattened and the tucks 24, flanking corners 22 and extending upward and outward from the lower portions thereof are tightly creased.

The pan then takes the form shown in Figure 3, except that the corner tucks are closed. Thereafter, as upper casting 54 and blanking punch 35 continue to descend together, compression springs 63 are compressed, permitting male die 60 to remain motionless for the time. Thus, the pan flanges 25 are formed by the mating of chamfer 36 in the punch 35 with the upper edges of blades 38. Inasmuch as blades 38 extend the full distance between the corner die segments 39, the flanging operation just described also turns outward and somewhat downward the upper portions of tucks 24, which, when so flanged, constitute plicas 26. The pan is then completed and is ejected by the pins 47 as the upper die portions raise. From inspection of Figures 4 and 5, the manner in which said plicas 26 strengthen the pan and prevent its unfolding is readily observed.

It is apparent that the steps of my process can be carried out with somewhat different dies and presses, whether single or double-acting. The embodiment illustrated is a convenient one to show the progression of operations but my invention is not limited to the use of the die specifically illustrated.

Nor is my process dependent upon any specific dimensions or proportions of the foil blanks from which the pans are formed. On inspection of Figure 3, it is apparent that the outer fold of each of tucks 24 (i. e., the fold visible on the outer side of the pan) will be of greater length than the inner fold. Such greater length is due to the general fan shape of corners 22 together with the manner of folding. As shown in Fig. 5 the outer fold line is substantially perpendicular to the base line of the pan and gives to the sides 23 greater height than the adjacent portions of the corners 22. However, it is obvious that the outer fold line may be at an angle to the base line of the pan other than perpendicular and still produce the greater height in the sides 23 over the adjacent portions of the corners 22. As shown in Figure 5, the point at which the sides 23 are bent outward to form flanges 25 is immediately above the upper margins of corners 22. Stated differently, the available width of flange 25 depends upon such difference in height as is provided between the walls 23 and the corner 22. Such difference in height also makes possible the plica 26, which results from the outward flanging of the portion of the tucked material extending above the height of the adjacent portion of corner 22.

Likewise, the order of operations might be changed so as to fold the pan sides before unfolding the corner portions outward thereof, completing the pan by flanging side margins, including tucked portions flanking the corners, in the manner hereinbefore described.

Other changes and modifications in the form, construction, arrangement and combination of the several portions of the pan, and in the steps comprising the method of its manufacture, may be made and substituted for those herein shown and described without departing from the nature and principle of my invention.

Having thus described my invention what I now claim and desired to secure by Letters Patent is—

1. The method of making a bakery goods baking and packaging pan from a sheet of foil material having in its flat condition a rectangular shape with fan-shaped rounded corners, which method includes the steps of punching a pan blank in flat condition and to the shape specified, first initiating the forming of the corners, from the plane of the blank to start inwardly directed folds along regulated lines at each side of the corners, simultaneously bending up the sides of the pan blank and completing the forming of the corners with the folds at each side against the inner surfaces of the pan sides, and stiffening the pan sides between the corners and securing the corner folds by outwardly turning the margins of the pan sides to form flanges extending into and catching the corner folds to lock the folds at each side of each corner.

2. The method of making a baking and packaging pan from a flat sheet of metallic foil material which includes the steps of forming a pan blank of rectangular outline with rounded corners between blanking dies, punching the pan blank into a forming die and, while still in the forming die, first moving the blank and corner forming dies relatively for initiating the forming of rounded corners by starting a pair of well defined creases at each side of the corners to start inwardly turned folds from the plane of the blank, relatively moving the forming and corner dies for substantially simultaneously closing the corner folds along the pairs of creases with the folds at each side against the inner surface of the pan sides, and stiffening the pan sides between the corners by forming the pan sides with outwardly rolled flanges extending into and catching the corner folds to lock the folds at each side of each corner, and ejecting the completely formed and stiffened pan from the forming die.

3. The method of making a pan from a flat sheet of metallic foil material comprising punching out a pan blank in flat condition to a rectangular shape having arcuately flattened corners, initiating the pan forming by starting a pair of fold creases fanning outwardly from each side of the corners of the blank to define each pan corner wall between two folds, continuing the pan forming by bending the corners and side walls out of the plane of the blank and simultaneously closing the corner folds to form tucks at the inside of the side walls with the folds at each side against the inner surfaces of the pan sides, and completing the pan forming by concurrently outwardly rolling the lip portions of the side walls between the corners to stiffen the side walls and carrying the side wall lip rolling operation into the corner tucks to lock the corner folds in the rolled lip portions of the side walls.

WILLIAM G. SWAINE.

References Cited in the file of this patent

UNITED STATES PATENTS

| Number | Name | Date |
|---|---|---|
| 820,976 | Katzinger | May 22, 1906 |
| 927,537 | Hothersall | July 13, 1909 |
| 1,304,740 | Carpenter | May 27, 1919 |
| 1,403,642 | Sauvage et al. | Jan. 17, 1922 |
| 1,438,698 | Debs | Dec. 12, 1922 |
| 2,358,457 | Jackson | Sept. 17, 1922 |
| 2,125,793 | Linderman | Aug. 2, 1938 |
| 2,216,147 | Ward | Oct. 1, 1940 |

FOREIGN PATENTS

| Number | Country | Date |
|---|---|---|
| 560,356 | Great Britain | Mar. 31, 1944 |